(12) United States Patent
Yamada

(10) Patent No.: US 11,100,112 B2
(45) Date of Patent: Aug. 24, 2021

(54) INFORMATION PROCESSING APPARATUS, SYSTEM, METHOD AND PROGRAM FOR REGISTERING AND RETRIEVING MENU AND INGREDIENTS

(71) Applicant: GURUNAVI, INC., Tokyo (JP)

(72) Inventor: Atsushi Yamada, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 172 days.

(21) Appl. No.: 16/084,096

(22) PCT Filed: Mar. 29, 2016

(86) PCT No.: PCT/JP2016/060210
§ 371 (c)(1),
(2) Date: Sep. 11, 2018

(87) PCT Pub. No.: WO2017/168583
PCT Pub. Date: Oct. 5, 2017

(65) Prior Publication Data
US 2019/0087465 A1 Mar. 21, 2019

(51) Int. Cl.
*G06F 16/33* (2019.01)
*G06F 16/2457* (2019.01)
(Continued)

(52) U.S. Cl.
CPC ...... *G06F 16/24575* (2019.01); *G06F 16/285* (2019.01); *G06F 16/3337* (2019.01);
(Continued)

(58) Field of Classification Search
CPC .. G06F 16/24575; G06F 16/285; G06F 40/40; G06F 40/58; G06F 16/3337;
(Continued)

(56) References Cited

U.S. PATENT DOCUMENTS 6,816,868 B1 * 11/2004 Shimizu .............. G06F 16/2282
10,366,434 B1 * 7/2019 Belousova ............ G06Q 50/12
(Continued)

FOREIGN PATENT DOCUMENTS

| JP | 2002-318814 A | 10/2002 |
| JP | 2003-222460 A | 8/2003 |

(Continued)

OTHER PUBLICATIONS

Communication dated Nov. 22, 2018, from the European Patent Office in application No. 16896803.0.
(Continued)

Primary Examiner — Alicia M Willoughby
(74) Attorney, Agent, or Firm — Sughrue Mion, PLLC

(57) ABSTRACT

An information processing apparatus, system, method, and program are provided. The information processing apparatus includes storage circuitry, communication circuitry and control circuitry. The storage circuitry stores ingredients classification information that is information obtained by classifying ingredients into upper and lower classes. The communication circuitry receives menu information from a user terminal. The control circuitry specifies each low-order ingredient that is an ingredient included in a lower class of each high-order ingredient, which is an ingredient of an upper class, from the ingredients classification information in a case where the high-order ingredient is included in the menu information, controls the communication circuitry to transmit ingredient information including information of the low-order ingredient to the user terminal, and receives registration of the menu information when the communication circuitry receives the menu information including the low-order ingredient.

9 Claims, 9 Drawing Sheets

| LARGE CLASSIFICATION | MIDDLE CLASSIFICATION | SMALL CLASSIFICATION |
|---|---|---|
| FISH | WHITE-FLESHED FISH | SEA BREAM |
| | | OLIVE FLOUNDER |
| | | SEA BASS |
| | | ... |
| | RED-FLESHED FISH | REAL TUNA |
| | | SKIPJACK TUNA |
| | | HERRING |
| | | ... |
| | ... | ... |
| VEGETABLE | ROOT VEGETABLE | RADISH |
| | | CARROT |
| | | BURDOCK |
| | | ... |
| | LEAF VEGETABLE | CABBAGE |
| | | LETTUCE |
| | | SPINACH |
| | | ... |
| | ... | ... |
| SEASONING | VINEGAR | MIXTURE OF VINEGAR |
| | | APPLE CIDER VINEGAR |
| | | BALSAMIC VINEGAR |
| | | ... |
| | SAUCE | OYSTER SAUCE |
| | | BECHAMEL SAUCE |
| | | CHILI SAUCE |
| | | ... |
| | ... | ... |

(51) Int. Cl.
*G06Q 50/12* (2012.01)
*G06Q 10/00* (2012.01)
*G06Q 10/02* (2012.01)
*G06Q 50/10* (2012.01)
*G06F 16/28* (2019.01)

(52) U.S. Cl.
CPC ............ *G06Q 10/00* (2013.01); *G06Q 10/02* (2013.01); *G06Q 50/10* (2013.01); *G06Q 50/12* (2013.01)

(58) Field of Classification Search
CPC ........ G06Q 50/12; G06Q 10/00; G06Q 10/02; G06Q 50/10
See application file for complete search history.

(56) References Cited

U.S. PATENT DOCUMENTS

| | | | |
|---|---|---|---|
| 2004/0044578 A1 | 3/2004 | Kim et al. | |
| 2004/0099144 A1* | 5/2004 | Kudo | G06Q 30/06 99/325 |
| 2005/0171800 A1 | 8/2005 | Yamaguchi | |
| 2007/0250493 A1* | 10/2007 | Peoples | G06F 16/3337 704/2 |
| 2007/0250494 A1* | 10/2007 | Peoples | G06F 16/3337 704/4 |
| 2011/0307243 A1* | 12/2011 | Miller | G06F 40/131 704/4 |
| 2012/0323707 A1* | 12/2012 | Urban | G06Q 50/12 705/15 |
| 2014/0095479 A1* | 4/2014 | Chang | G06F 16/335 707/722 |
| 2015/0032727 A1* | 1/2015 | Chung | G06F 16/9535 707/722 |
| 2015/0066909 A1* | 3/2015 | Uchida | G06F 16/951 707/722 |
| 2015/0154690 A1* | 6/2015 | Park | G06Q 30/0241 705/27.2 |
| 2015/0199614 A1* | 7/2015 | Pinel | G06K 9/00496 706/52 |
| 2016/0110423 A1* | 4/2016 | Uchida | G06F 16/248 707/771 |
| 2016/0275597 A1* | 9/2016 | Ueda | G06Q 30/0635 |
| 2017/0017503 A1* | 1/2017 | Levy | G06F 40/58 |
| 2017/0097934 A1* | 4/2017 | Aso | G06F 16/24578 |
| 2019/0080384 A1* | 3/2019 | Radcliffe | G06Q 30/0621 |
| 2019/0295440 A1* | 9/2019 | Hadad | G06F 40/216 |

FOREIGN PATENT DOCUMENTS

| | | |
|---|---|---|
| JP | 2010-44712 A | 2/2010 |
| JP | 2011-113374 A | 6/2011 |
| JP | 2012-3319 A | 1/2012 |
| JP | 2015-49763 A | 3/2015 |
| JP | 2015-194857 A | 11/2015 |
| WO | 2015145525 A1 | 10/2015 |

OTHER PUBLICATIONS

Communication dated Jan. 17, 2019 issued by the Intellectual Property Office of Taiwan in counterpart application No. 105141634.
Communication dated Nov. 11, 2019, issued by the Korean Intellectual Property Office in corresponding Korean Application No. 10-2018-7025563.
International Search Report for PCT/JP2016/060210 dated May 17, 2016 [PCT/ISA/210].
Communication dated Jun. 5, 2020, from the Taiwanese Intellectual Property Office in application No. 109106303.
Communication dated May 27, 2020, from the Korean Intellectual Property Office in application No. 10-2018-7025563.

* cited by examiner

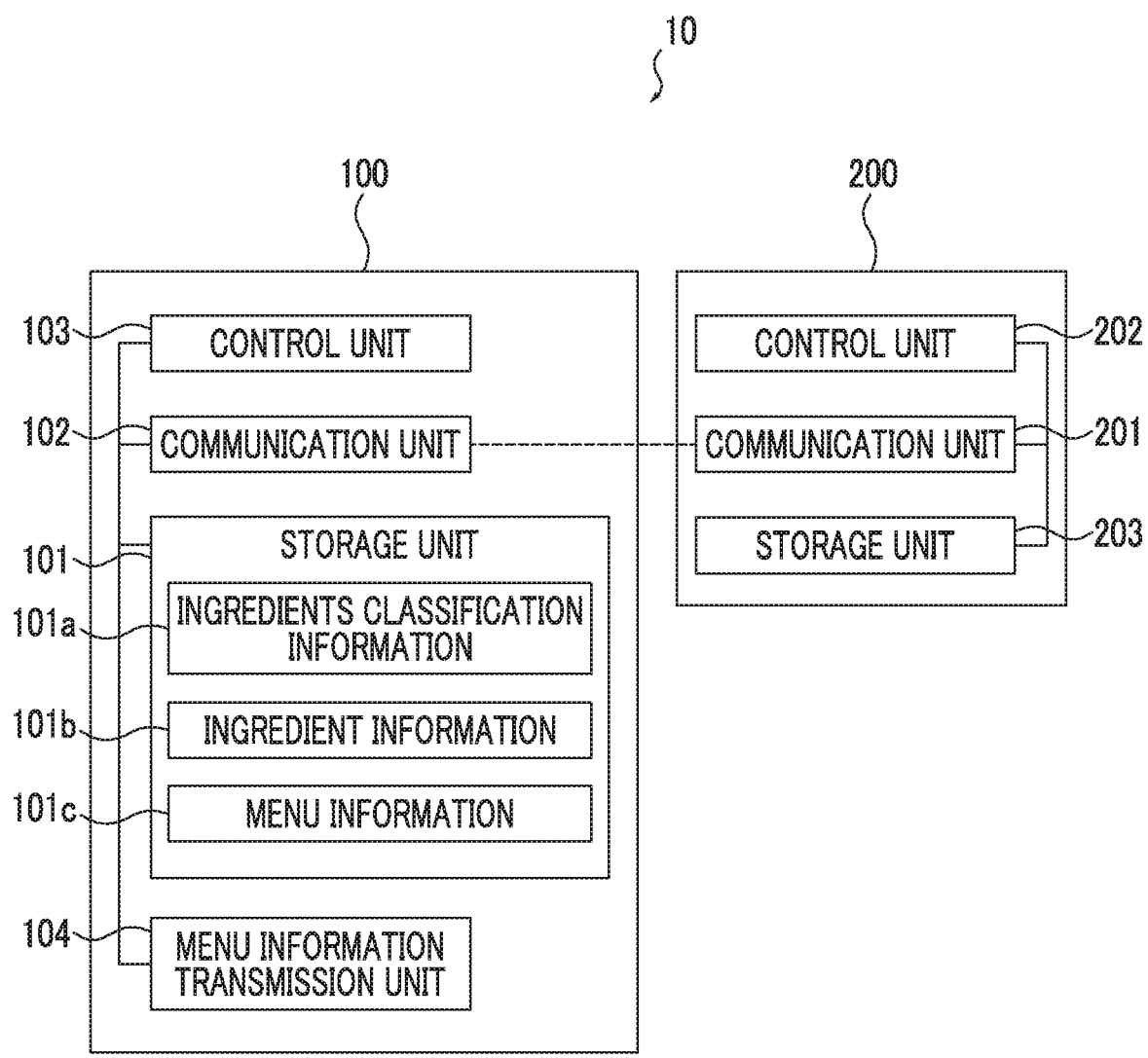

FIG. 3

| LARGE CLASSIFICATION | MIDDLE CLASSIFICATION | SMALL CLASSIFICATION |
|---|---|---|
| FISH | WHITE-FLESHED FISH | SEA BREAM |
| | | OLIVE FLOUNDER |
| | | SEA BASS |
| | | ... |
| | RED-FLESHED FISH | REAL TUNA |
| | | SKIPJACK TUNA |
| | | HERRING |
| | | ... |
| | ... | ... |
| VEGETABLE | ROOT VEGETABLE | RADISH |
| | | CARROT |
| | | BURDOCK |
| | | ... |
| | LEAF VEGETABLE | CABBAGE |
| | | LETTUCE |
| | | SPINACH |
| | | ... |
| | ... | ... |
| SEASONING | VINEGAR | MIXTURE OF VINEGAR |
| | | APPLE CIDER VINEGAR |
| | | BALSAMIC VINEGAR |
| | | ... |
| | SAUCE | OYSTER SAUCE |
| | | BECHAMEL SAUCE |
| | | CHILI SAUCE |
| | | ... |
| | ... | ... |

FIG. 5

| STORE NAME | RESTAURANT ○○ |
| --- | --- |
| COOKING TYPE | GRILLED FISH |
| DISH | MEUNIERE OF WHITE-FLESHED FISH |
| INGREDIENTS 1 | WHITE-FLESHED FISH |
| 2 | FLOOR |
| 3 | BUTTER |
| 4 | ... |

INFORMATION PROCESSING APPARATUS, SYSTEM, METHOD AND PROGRAM FOR REGISTERING AND RETRIEVING MENU AND INGREDIENTS

CROSS REFERENCE TO RELATED APPLICATIONS

This application is a National Stage of International Application No. PCT/JP2016/060210, filed on Mar. 29, 2016.

BACKGROUND OF THE INVENTION

1. Field of the Invention

The present invention relates to an information processing apparatus, an information processing system, an information processing method, and a program that are used to register menu information.

2. Description of Related Art

A system has been used in which menu information is registered in a server when a manager of a restaurant inputs the menu information, such as ingredients or a cooking method of a menu provided in the restaurant, to an information terminal. The user of the restaurant can check the menu information before visit or during visit with reference to the menu information. In particular, in a case where a restaurant is located in a foreign country, it is easy to check ingredients and the like. Accordingly, this is highly convenient.

For example, PTL 1 discloses a technique in which a server stores cooking information including the ingredients of each dish provided in a restaurant and distributes cooking information, which is changed according to the nationality of the user, to the user terminal. The change of cooking information is performed by highlighting the least favorite ingredients registered for each country.

CITATION LIST

Patent Literature

PTL 1: Japanese Unexamined Patent Application Publication No. 2015-49763

In the above system, the restaurant manager is requested to register detailed ingredients. However, there are differences in the classification of ingredients depending on the food culture. For example, in Japan, a detailed classification according to a fish name, such as sea bream, olive flounder, and sea bass, is made. On the other hand, in Europe and the United States, a collective classification, such as white-fleshed fish, is made in many cases.

For this reason, there is a case in which the detailed names of ingredients used in a menu, in which the names of ingredients are to be registered by the restaurant manager, are unknown. Accordingly, even if an effort to collect menu information between different food cultures is made, it has not been easy to collect the menu information including the detailed ingredients since the restaurant manager cannot register the detailed ingredients.

In view of the aforementioned situation, it is an object of the present invention to provide an information processing apparatus, an information processing system, an information processing method, and a program capable of easily collecting menu information including the detailed ingredients.

SUMMARY OF THE INVENTION

In order to achieve the aforementioned object, an information processing apparatus according to an aspect of the present invention is an information processing apparatus for receiving the registration of menu information that is information of a menu including ingredients input in a user terminal, and includes storage means, communication means, and control means.

The storage means stores ingredients classification information that is information obtained by classifying ingredients into upper and lower classes.

The communication means receives the menu information from the user terminal.

The control means specifies each low-order ingredient that is an ingredient included in a lower class of each high-order ingredient, which is an ingredient of an upper class, from the ingredients classification information in a case where the high-order ingredient is included in the menu information, controls the communication means to transmit ingredient information including information of the low-order ingredient to the user terminal, and receives the registration of the menu information when the communication means receives the menu information including the low-order ingredient.

When the user (store manager) of the user terminal registers menu information that is information, such as a store name, a dish name, and ingredients, detailed ingredient names may be unknown. According to the configuration described above, if the user of the user terminal inputs high-order ingredients when registering menu information, ingredient information (ingredient image or the like) of low-order ingredients included in the lower class of the high-order ingredients is presented. By referring to the ingredient information, the user of the user terminal can check the ingredient names. Therefore, it is possible to include a detailed ingredient name in the menu information.

The ingredient information may be an image of the low-order ingredient.

In the case of an ingredient having a feature in its appearance, such as fish or a vegetable, an image (photograph or illustration) of the ingredient can be presented as ingredient information so that the user of the user terminal can easily check the ingredient name.

The ingredient information may be a detailed description of the low-order ingredient.

In the case of an ingredient that is difficult to determine with its appearance, such as seasoning, a detailed description, such as the production area, raw materials, and a manufacturing method of the ingredient can be presented as ingredient information so that the user of the user terminal can easily check the ingredient name.

The communication means may further acquire a location of the user terminal from the user terminal, and the control means may control the communication means to transmit ingredient information of an ingredient selected according to the location, among the low-order ingredients, to the user terminal.

According to this configuration, the control means can select ingredients excluding ingredients (for example, some of the seafood), which are not edible in the location of the user terminal, among the low-order ingredients, and transmit the ingredient information of the selected ingredients to the user terminal. Accordingly, since the number of pieces of ingredient information presented to the user of the user terminal is limited, the user can easily select ingredients used in the menu.

The control means may control the communication means to transmit ingredient information of an ingredient selected according to a language used for an input of the menu information, among the low-order ingredients, to the user terminal.

According to this configuration, the control means can select ingredients excluding ingredients, which are not edible in a region where the language used for the input of menu information is used, among the low-order ingredients, and transmit the ingredient information of the selected ingredients to the user terminal. Accordingly, since the number of pieces of ingredient information presented to the user of the user terminal is limited, the user can easily select ingredients used in the menu.

The control means may control the communication means to transmit ingredient information of an ingredient selected according to a time at which the menu information is received, among the low-order ingredients, to the user terminal.

According to this configuration, the control means can select ingredients excluding ingredients (for example, vegetables whose harvest time is limited), which are not edible at the time at which menu information is received, among the low-order ingredients, and transmit the ingredient information of the selected ingredients to the user terminal. Accordingly, since the number of pieces of ingredient information presented to the user of the user terminal is limited, the user can easily select ingredients used in the menu.

The storage means may further store multilingual information corresponding to each of upper and lower classes of the ingredient, and menu information transmission means for transmitting an upper or lower class of the ingredient corresponding to a specific language to the display terminal when a request to display menu information written in the specific language is received from the display terminal may be further provided.

According to this configuration, by inputting a request to display menu information that is written in a specific language, the user of the display terminal can refer to upper or lower classes of ingredients corresponding to the language in the display terminal.

The menu information transmission means may transmit an upper class of the ingredient to the display terminal in a case where there is no language information regarding a lower class of the ingredient that is written in the specific language.

According to this configuration, in a case where there is no language information (translation) regarding a lower class of the ingredient that is written in the specific language, it is possible to check the ingredient with reference to the upper class.

The menu information transmission means may transmit a lower class of the ingredient to the display terminal in a case where there is no language information regarding a lower class, which is written in a language used for an input of menu information in the user terminal, and there is language information regarding a lower class of the ingredient written in the specific language.

According to this configuration, in a case where there is language information (translation) regarding a lower class of the ingredient that is written in the specific language, it is possible to check the ingredient with reference to the lower class.

In order to achieve the aforementioned object, an information processing system according to an aspect of the present invention includes a first information processing apparatus and a second information processing apparatus.

The first information processing apparatus is first information processing apparatus for receiving registration of menu information that is information of a menu including ingredients input in the second information processing apparatus, and storage means, first communication means, and first control means.

The storage means stores ingredients classification information that is information obtained by classifying ingredients into upper and lower classes.

The first communication means receives the menu information from the second information processing apparatus.

The first control means specifies each low-order ingredient that is an ingredient included in a lower class of each high-order ingredient, which is an ingredient of an upper class, from the ingredients classification information in a case where the high-order ingredient is included in the menu information, controls the communication means to transmit ingredient information including information of the low-order ingredient to the second information processing apparatus, and receives registration of the menu information when the communication means receives the menu information including the low-order ingredient.

The second information processing apparatus includes second communication means and second control means.

The second communication means receives the ingredient information from the first communication means.

The second control means controls the second communication means to transmit the menu information to the first information processing apparatus, and presents the ingredient information to a user when the second communication means receives the ingredient information.

In order to achieve the aforementioned object, an information processing method according to an aspect of the present invention is an information processing method of receiving registration of menu information that is information of a menu including ingredients input in a user terminal. The information processing method includes: storing ingredients classification information that is information obtained by classifying ingredients into upper and lower classes; receiving the menu information from the user terminal; and specifying each low-order ingredient that is an ingredient included in a lower class of each high-order ingredient, which is an ingredient of an upper class, from the ingredients classification information in a case where the high-order ingredient is included in the menu information, controlling the communication means to transmit ingredient information including information of the low-order ingredient to the user terminal, and receiving registration of the menu information when the communication means receives the menu information including the low-order ingredient.

In order to achieve the aforementioned object, a program according to an aspect of the present invention causes an information processing apparatus for receiving registration of menu information, which is information of a menu including ingredients input in a user terminal, to execute: a step of storing ingredients classification information that is information obtained by classifying ingredients into upper and lower classes; a step of receiving the menu information from the user terminal; and a step of specifying each low-order ingredient that is an ingredient included in a lower class of each high-order ingredient, which is an ingredient of an upper class, from the ingredients classification information in a case where the high-order ingredient is included in the menu information, controlling the communication means to transmit ingredient information including information of the low-order ingredient to the user terminal, and receiving registration of the menu information when the communication means receives the menu information including the low-order ingredient.

As described above, according to the present invention, it is possible to provide an information processing apparatus, an information processing system, an information processing method, and a program capable of easily collecting menu information including the detailed ingredients. However, the effect does not limit the present invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a block diagram showing the functional configuration of the information processing system;

FIG. 3 is an example of ingredients classification information stored in a storage unit provided in a server apparatus of the information processing system;

FIG. 5 is an example of a menu information registration site displayed in a user terminal of the information processing system;

DETAILED DESCRIPTION OF EMBODIMENTS

An information processing system according to an embodiment of the present invention will be described.

[Configuration of an Information Processing System]

Figure 1:
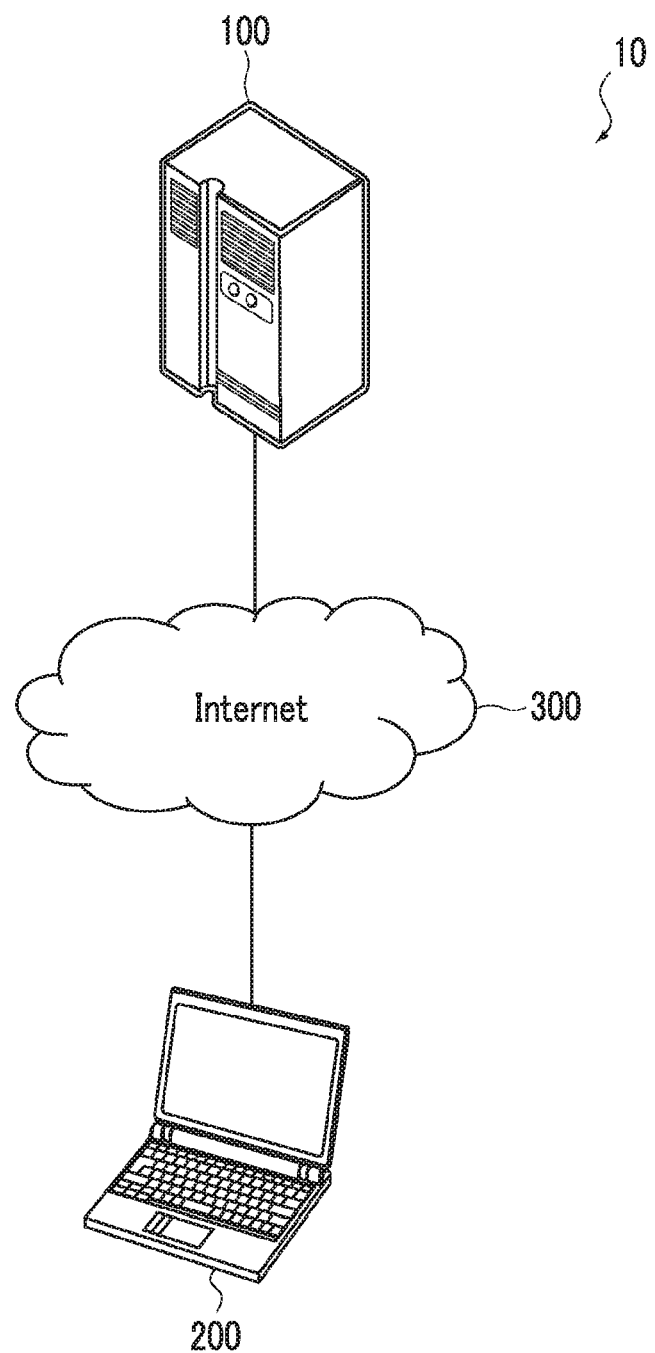
FIG. 1 is a schematic diagram of an information processing system according to an embodiment of the present invention.

FIG. 1 is a schematic diagram showing the configuration of an information processing system 10 according to the present embodiment. As shown in FIG. 1, the information processing system 10 includes a server apparatus 100 and a user terminal 200. The server apparatus 100 and the user terminal 200 are connected to each other through the Internet 300.

The server apparatus 100 is a web server that provides menu information, and the user terminal 200 is an information processing apparatus that can access the server apparatus 100 through the Internet 300. The user terminal 200 is a terminal that the manager of a restaurant uses, for example, a tablet personal computer (PC), a notebook PC, a smartphone, and the like.

FIG. 2 is a block diagram showing the functional configuration of the server apparatus 100 and the user terminal 200. As shown in FIG. 2, the server apparatus 100 includes a storage unit 101, a communication unit 102, a control unit 103, and a menu information transmission unit 104, and the user terminal 200 includes a communication unit 201, a control unit 202, and a storage unit 203.

The storage unit 101 stores ingredients classification information 101a, ingredient information 101b, and menu information 101c. The details thereof will be described later. The communication unit 102 communicates with the communication unit 201 to receive menu information from the communication unit 201 under the control of the control unit 103.

When the communication unit 102 receives the menu information, the control unit 103 receives the registration of the menu information. In this case, if necessary, the control unit 103 specifies ingredients using the ingredients classification information 101a, and controls the communication unit 102 to transmit the ingredient information of the specified ingredients to the communication unit 201.

When a request to display menu information written in a specific language is received from a display terminal that the user of the restaurant uses for reference of menu information, the menu information transmission unit 104 transmits upper or lower classes of ingredients corresponding to the specific language to the display terminal.

The communication unit 201 communicates with the communication unit 102 to transmit the menu information to the communication unit 102 under the control of the control unit 202. The control unit 202 receives the input of the menu information from the user, and controls the communication unit 201 to transmit the menu information to the communication unit 102. The storage unit 203 temporarily stores the input menu information or the like.

FIG. 3 is an example of the ingredients classification information 101a. As shown in FIG. 3, the ingredients classification information 101a is a database obtained by classifying ingredients. Ingredients are classified into a large class (for example, fish), a middle class (for example, white-fleshed fish), and a small class (for example, olive flounder). In addition, classification is not limited to the three steps of a large class, a middle class, and a small class, and may be two steps or four or more steps. The ingredients classification information 101a may include ingredients for which ingredient names are present in other languages but ingredient names are not present in a specific language. In addition, ingredients include seasoning.

The ingredients classification information 102a can be created by the administrator of the server apparatus 100. Although the ingredients classification information 102a shown in FIG. 3 is shown in only one language (Japanese), the ingredients classification information 102a may be a database of ingredient names obtained by translating ingredients to a plurality of languages.

The ingredient information 101b is information that is registered for each ingredient classified into the small class in the ingredients classification information 101a and that indicates the characteristics of each ingredient. For example, the ingredient information 101b can be made as images, such as photographs or illustrations of ingredients, and the text of a detailed description, such as the production area, raw materials, and a manufacturing method of ingredients. An image can be set as the ingredient information 101b in the case of an ingredient having a feature in its appearance, such as fish, and the text can be set as the ingredient information 101b in the case of an ingredient having no feature in its appearance, such as seasoning. In a case where ingredient information is a text, it is desirable to set the text of each language as the ingredient information.

The ingredient information 101b may be registered for all ingredients classified into the small class, or may be registered for some ingredients. For example, the ingredient information 101b may be registered only for ingredients whose names are not present among the ingredients classified into the small class. The ingredient information 101b can be created by the administrator of the server apparatus 100 together with the ingredients classification information 101a.

In addition, all or some of the pieces of ingredient information 101b may be stored in a different server apparatus from the server apparatus 100. In this case, for example, it is possible to assign an identification number to each ingredient in the ingredients classification information 101a and to associate the identification number with the ingredient information 101b.

[Operation of the Information Processing System]

Figure 4:
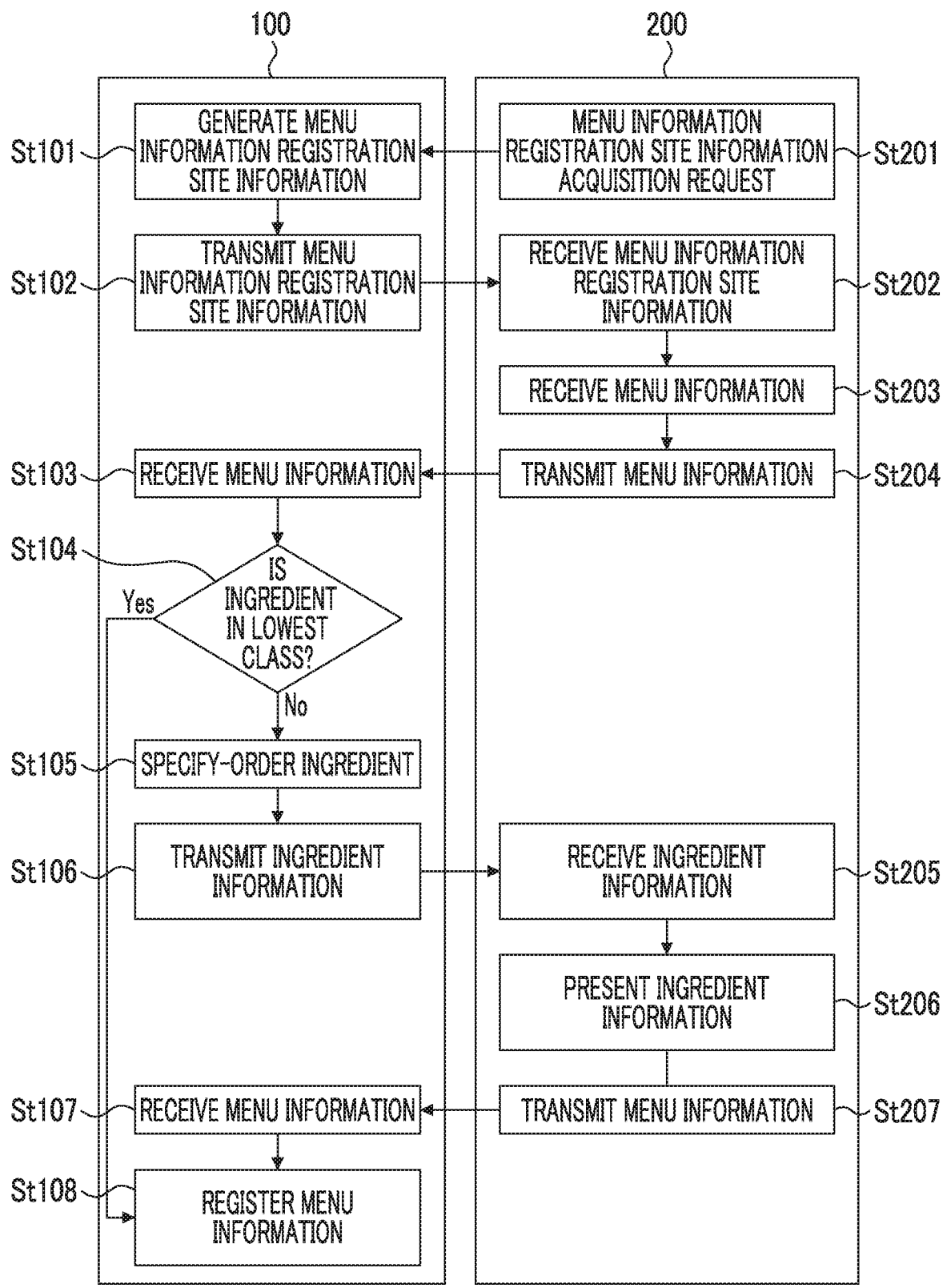
FIG. 4 is a flowchart showing the operation of the information processing system.

FIG. 4 is a flowchart showing the operation of the information processing system 10. When a user accesses a web site for registration of menu information (hereinafter, referred to as a menu information registration site) using the user terminal 200, the control unit 202 controls the communication unit 201 to transmit a menu information registration site information acquisition request to the communication unit 102 (St201). It is possible to access the menu information registration site using a browser or an application.

When the communication unit 102 receives the menu information registration site information acquisition request, the control unit 103 generates menu information registration site information that is information forming the menu information registration site (St101). At this time, the control unit 103 can include the ingredient names of each class in the menu information registration site information with reference to the ingredients classification information 101a. The control unit 103 controls the communication unit 102 to transmit the menu information registration site information to the communication unit 201 (St102).

When the communication unit 201 receives the menu information registration site information (St202), the control unit 202 generates the menu information registration site, and receives the input of the menu information of the user in the menu information registration site (St203). FIG. 5 is an example of a menu information registration screen of a menu information registration site displayed in the user terminal 200. As shown in FIG. 5, the menu information is information regarding a menu, such as a store name, dish type, dish name, and ingredients, and the user can input the menu information of a menu that the user desires to register. The content of the menu information is not particularly limited, and at least ingredients may be included in the menu information.

Figure 6:
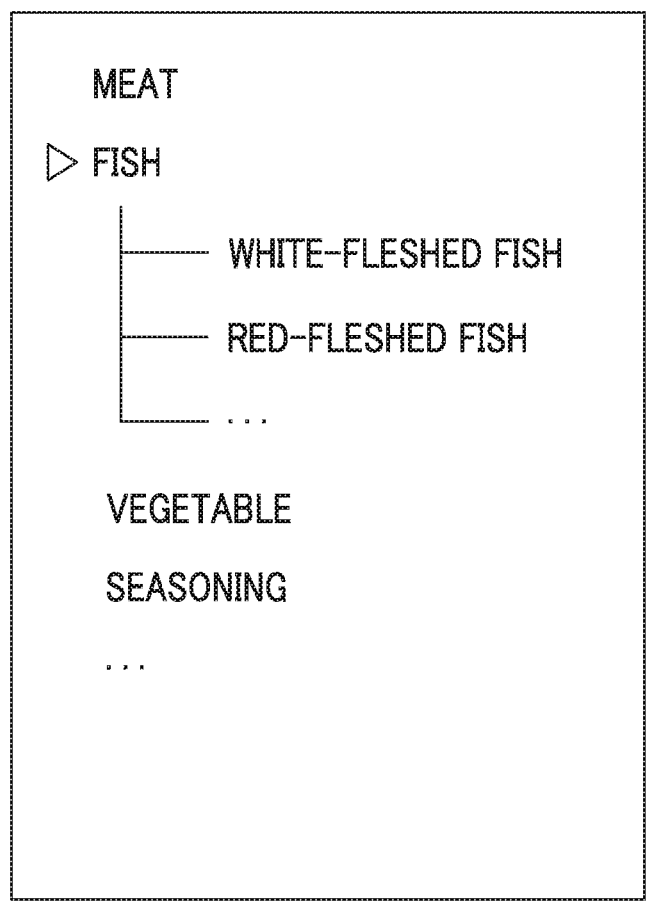
FIG. 6 is an example of choices of ingredients in the menu information registration site displayed in the user terminal of the information processing system.

FIG. 6 is an example of the choices of ingredients displayed at the time of selection of ingredients. As shown in FIG. 6, the choices of ingredients can be presented to the input field of ingredients. The choices can be set by arranging the ingredients included in the ingredients classification information 101a according to the classification of the ingredients classification information 101a.

The user can select the ingredients of a menu, which needs to be registered, from the choices in the user terminal 200. In addition, the user may directly input the character string of each ingredient name. The user can input one or more ingredients in the menu information registration site.

When the menu information is input, the control unit 202 controls the communication unit 201 to transmit the menu information to the communication unit 102 (St204).

When the communication unit 102 receives the menu information (St103), the control unit 103 determines in which class in the ingredients classification information each ingredient included in the menu information is included (St104). In a case where each ingredient included in the menu information is included in the lowest class (for example, "small class" in FIG. 3) (St104: Yes), the control unit 103 registers the menu information (St108).

On the other hand, in a case where each ingredient included in the menu information is included in a class (for example, "middle class" in FIG. 3) other than the lowest class (St103: No), the control unit 103 specifies ingredients (hereinafter, referred to as low-order ingredients) included in the lower class of ingredients (hereinafter, referred to as high-order ingredients) included in the menu information (St105). For example, in a case where the ingredients included in the menu information are "white-fleshed fish", "sea bream", "olive flounder", and "sea bass" included in the lower class are specified as low-order ingredients.

Then, the control unit 103 reads the ingredient information 101b associated with the specified low-order ingredients from the storage unit 101, and controls the communication unit 102 to transmit the ingredient information to the communication unit 201 (St106). In the example described above, ingredient information, such as "sea bream", "olive flounder", and "sea bass", is transmitted to the communication unit 201.

Figure 7:
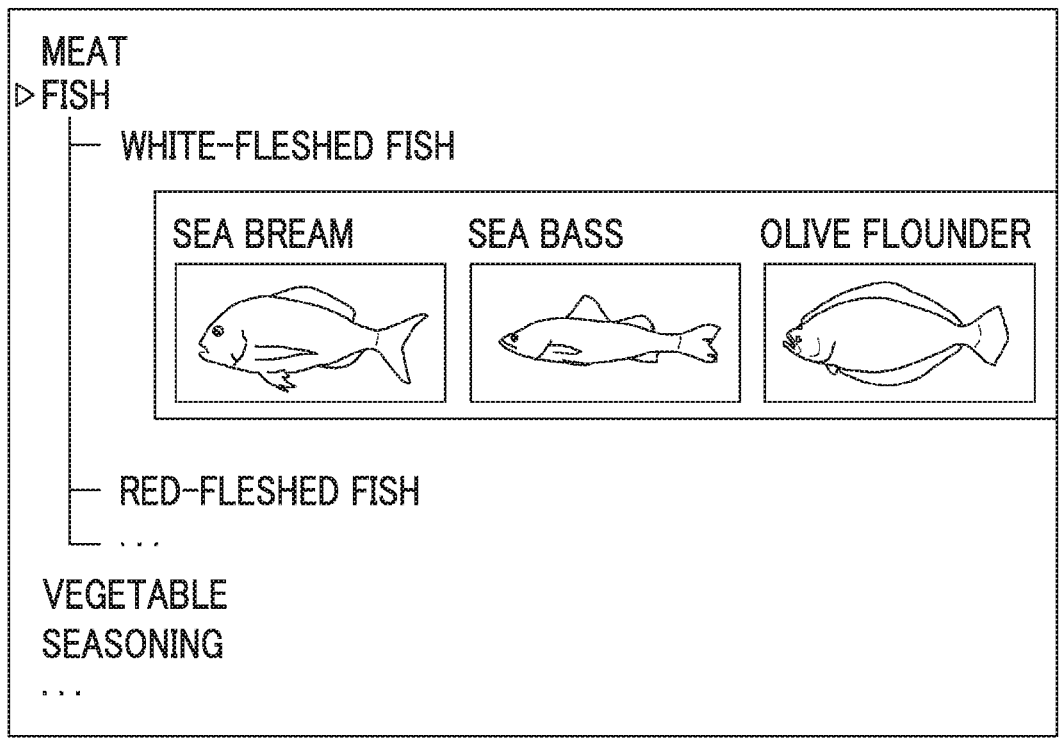
FIG. 7 is an example of ingredient information in the menu information registration site displayed in the user terminal of the information processing system.

When the communication unit 201 receives the ingredient information (St205), the control unit 202 presents the ingredient information received in the menu information registration site (St206). FIG. 7 is an example of a menu information registration site displayed in the user terminal 200. As shown in FIG. 7, in a case where ingredients are fish, fish images that are the ingredient information transmitted from the server apparatus 100 together with the ingredient names are presented.

Figure 8:
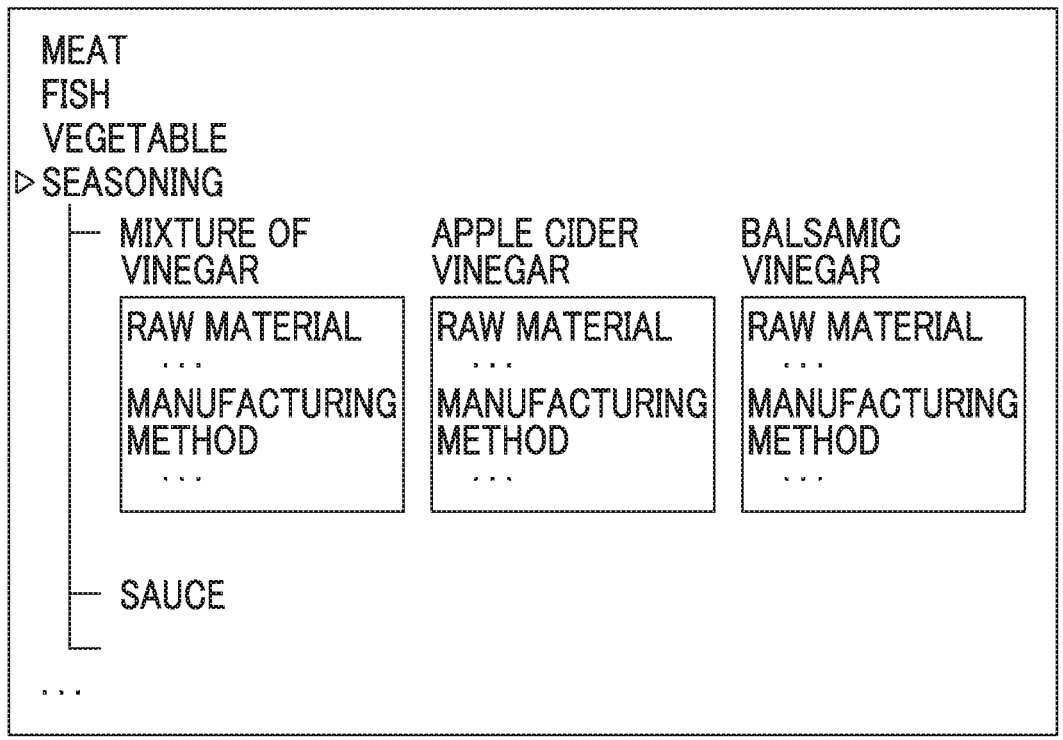
FIG. 8 is an example of ingredient information in the menu information registration site displayed in the user terminal of the information processing system.

FIG. 8 is another example of the menu information registration site displayed in the user terminal 200. As shown in this drawing, in a case where ingredients are vinegar, raw materials, a manufacturing method, and the like of the vinegar that are the ingredient information transmitted from the server apparatus 100 together with the ingredient names can be presented.

The user can specify ingredients, which are used for the menu to be registered, with reference to the presented ingredient information. For example, even in a country in which sea bream, olive flounder, and sea bass are expressed in the same ingredient names, it is possible to specify low-order ingredients, which are used in the menu to be registered, with reference to the ingredient information.

When the user inputs the low-order ingredients specified using the ingredient information, the control unit 202 controls the communication unit 201 to transmit the menu information including the ingredients to the communication unit 102 (St207).

When the communication unit 102 receives the menu information (St107), the control unit 103 registers the menu information (St108), and stores the menu information in the storage unit 101. The menu information 101c is registered in the server apparatus 100 as described above.

A number of user terminals 200 are connected to the server apparatus 100 through the Internet 300, and the menu information of each menu is registered into the server apparatus 100 from each user terminal 200 as described above.

By accessing the server apparatus 100 using a display terminal, such as a smart phone or a PC, the user of a store can refer to menu information. Therefore, it is possible to select a store or to check ingredients.

As described above, the user can refer to the ingredient information of low-order ingredients by inputting the high-order ingredients. Accordingly, even if the names of low-order ingredients are unknown, it becomes easy to specify the ingredients of the lower class. Therefore, it is also possible to use the ingredients classification information 101*a* between food cultures in which the classifications of ingredients are different.

[For Selection of Ingredients]

In the above description, in a case where high-order ingredients are included in the menu information, the control unit specifies the low-order ingredients, and transmits the ingredient information to the user terminal 200. In this case, however, the control unit 103 may select some of the low-order ingredients, and transmit only the ingredient information of the selected ingredients to the user terminal 200.

The control unit 103 can select low-order ingredients according to the location of the user terminal 200. Specifically, the control unit 103 can select ingredients excluding ingredients (for example, specific seafood), which are not edible in regions including the location of the user terminal 200, among the low-order ingredients of ingredients included in the menu information. The location of the user terminal 200 can be acquired using the IP address or the like included in the menu information.

The control unit 103 can transmit only the ingredient information of the selected ingredients, among the low-order ingredients, to the user terminal 200. Accordingly, since the number of pieces of ingredient information presented to the user is limited, the user can easily select ingredients used in the menu.

The control unit 103 can also specify low-order ingredients according to the language used for the input of the menu information. Specifically, the control unit 103 can also select ingredients excluding ingredients, which are not edible in regions where the language used for the input of the menu information is used, among the low-order ingredients of ingredients included in the menu information.

In addition, the control unit 103 can also select low-order ingredients according to the menu information receiving time. Specifically, the control unit 103 can also select ingredients excluding ingredients (for example, vegetables whose harvest time is limited), which are not edible at the time at which menu information is received, among the low-order ingredients of ingredients included in the menu information.

In addition, the control unit 103 can also select low-order ingredients according to the location of the user terminal 200 and the time at which menu information is received. Specifically, the control unit 103 can also select ingredients excluding ingredients, which are not edible at the time at which menu information is received in the location of the user terminal 200, among the low-order ingredients of ingredients included in the menu information.

In addition, the control unit 103 can also select low-order ingredients according to the language used for the input of menu information and the time at which the menu information is received. Specifically, the control unit 103 can also select ingredients excluding ingredients, which are not edible at the time at which the menu information is received in regions where the language used for the input of the menu information is used, among the low-order ingredients of ingredients included in the menu information.

Information that the control unit 103 uses for the selection of ingredients, for example, regions where ingredients are edible, time at which ingredients are edible, and the like are stored in the storage unit 101 so as to be associated with each ingredient included in the ingredients classification information 101*a*. Accordingly, the control unit 103 can select ingredients with reference to the information.

[For Transmission of Menu Information to the Display Terminal]

When the user of a store accesses the server apparatus 100 using a display terminal, the server apparatus 100 transmits the menu information to the display terminal. In this case, the server apparatus 100 can select information to be transmitted to the display terminal using the ingredients classification information 101*a*.

Specifically, the storage unit 101 stores multilingual information corresponding to each of the upper and lower classes of ingredients. The multilingual information is ingredient names written in respective languages, and the administrator of the server apparatus 100 can generate multilingual information and associate the multilingual information with each ingredient.

When a request to display menu information written in a specific language is received from the display terminal, the menu information transmission unit 104 transmits, for ingredients included in the menu information, upper or lower classes of the ingredients corresponding to the language to the display terminal.

Specifically, in a case where there is no language information regarding lower classes of ingredients that is written in the specific language, the menu information transmission unit 104 transmits only upper classes of the ingredients to the display terminal. For example, in a case where "sea bream" is included in menu information that is requested to be displayed in a specific language from the display terminal, "white-fleshed fish" which is an upper class of "sea bream" and for which language information written in a specific language is present is transmitted to the display terminal in a case where there is no ingredient name corresponding to "sea bream" that is written in the specific language. In a case where there is no ingredient name corresponding to "white-fleshed fish" that is written in the specific language, "fish" that is the upper class of "white-fleshed fish" is transmitted to the display terminal.

In addition, in a case where there is no language information regarding lower classes that is written in a language used for the input of menu information from the user terminal 200 and there is language information regarding lower classes of ingredients written in the specific language, the menu information transmission unit 104 transmits the lower classes of the ingredients to the display terminal. For example, in a case where there is no ingredient name corresponding to "sea bream" that is written in a language used for the input of menu information from the user terminal 200 and "sea bream" is included in menu information that is requested to be displayed in a specific language from the display terminal, "sea bream" is transmitted to the display terminal in a case where there is an ingredient name corresponding to "sea bream" that is written in the language.

Therefore, by sending a request to display menu information written in a specific language, the user of a store can refer to upper or lower classes of ingredients according to ingredient names present in the language.

In addition, the menu information transmission unit 104 can also select ingredient names to be transmitted according to the time at which a menu information display request is received. For example, even in the case of the same ingredient, regardless of the season of the input of menu information from the user terminal 200, a term "winter" is transmitted to the display terminal in a case where the time at which a menu information display request is received is winter.

[Hardware Configuration]

Figure 9:
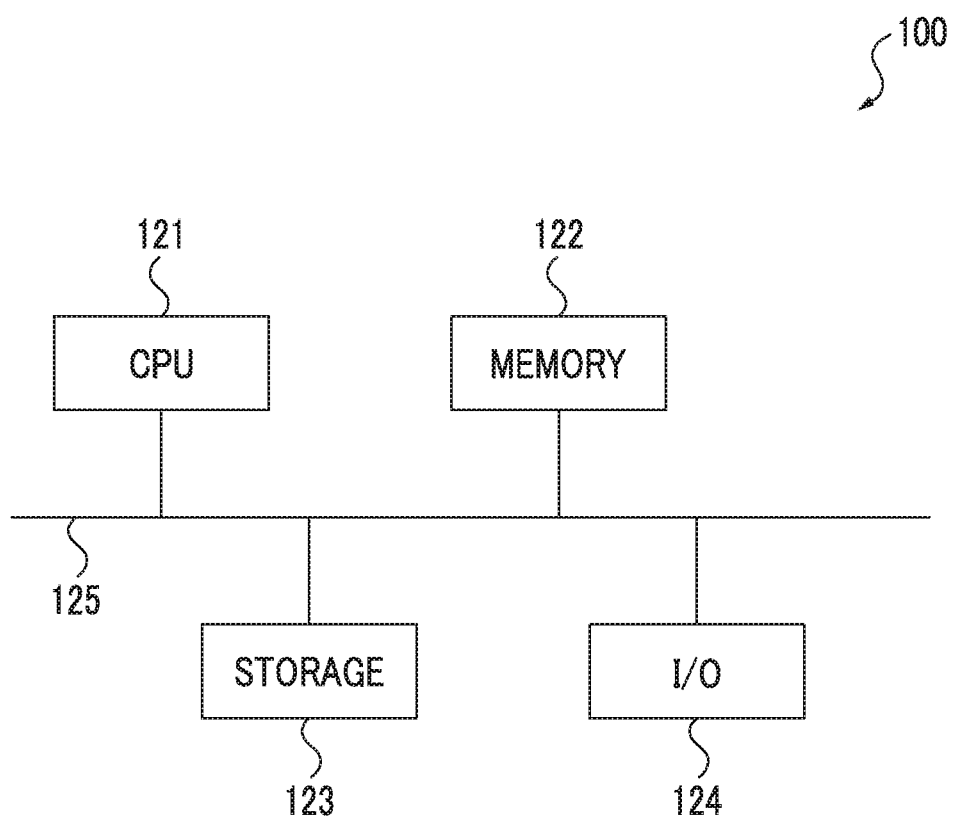
FIG. 9 is a block diagram showing the hardware configuration of the server apparatus of the information processing system.

FIG. 9 is a block diagram showing the hardware configuration of the server apparatus 100. As shown in FIG. 9, the server apparatus 100 includes a central processing unit (CPU) 121, a memory 122, a storage 123, and an input/output unit (I/O) 124 as a hardware configuration. These are connected to each other by a bus 125.

The CPU 121 controls other configurations according to a program stored in the memory 122, and performs data processing according to the program and stores the processing result in the memory 122. The CPU 121 functions as the control unit 103 in the functional configuration of the server apparatus 100.

The memory 122 temporarily stores data and programs executed by the CPU 121. The memory 122 can be a random access memory (RAM). The memory 122 functions as the storage unit 101 in the functional configuration of the server apparatus 100 together with the storage 123.

The storage 123 stores a program or data. The storage 123 can be a hard disk drive (HDD), a solid state drive (SSD), or the like. The storage 123 functions as the storage unit 101 in the functional configuration of the server apparatus 100 together with the memory 122.

The input/output unit 124 receives an input to the server apparatus 100, and supplies the output of the server apparatus 100 to the outside. The input/output unit 124 includes a connection interface, such as a network. The input/output unit 124 functions as the communication unit 102 in the functional configuration of the server apparatus 100.

The hardware configuration of the server apparatus 100 is not limited to that shown herein, and any configuration capable of realizing the functional configuration of the server apparatus 100 may be adopted. The entire hardware configuration described above or a part of the hardware configuration may be present on a network.

Figure 10:
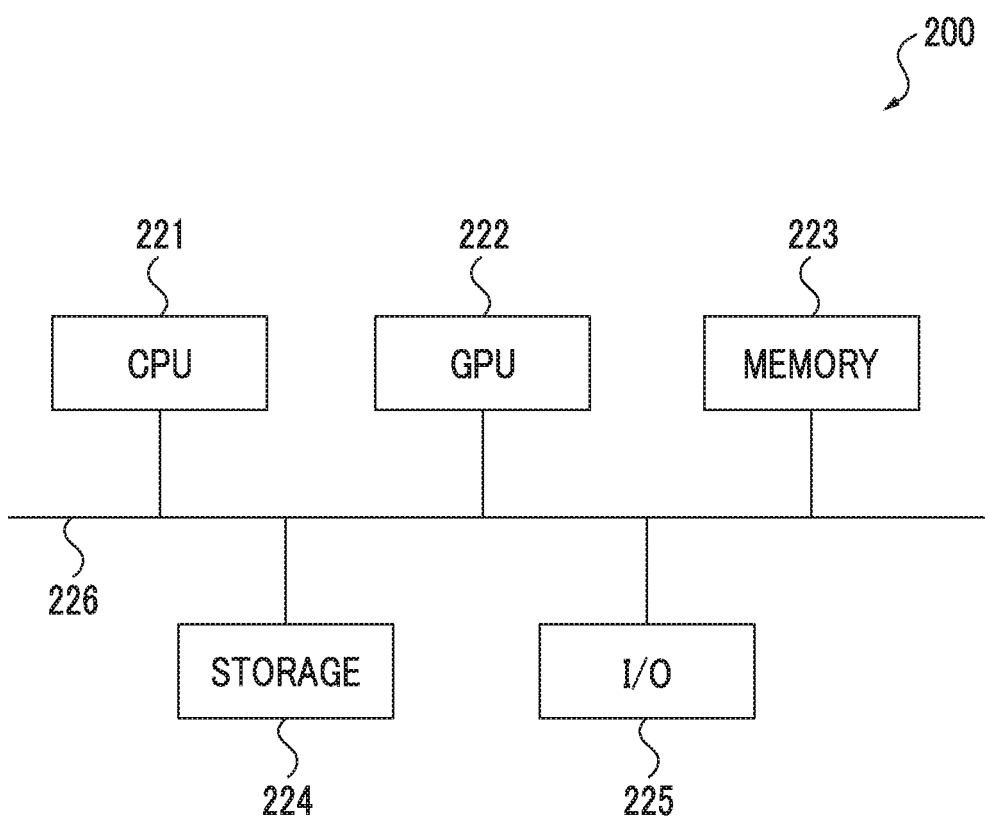
FIG. 10 is a block diagram showing the hardware configuration of the user terminal of the information processing system.

FIG. 10 is a block diagram showing the hardware configuration of the user terminal 200. As shown in FIG. 10, the user terminal 200 includes a CPU 221, a graphic processing unit (GPU) 222, a memory 223, a storage 224, and an input/output unit (I/O) 225 as a hardware configuration. These are connected to each other by a bus 226.

The CPU 221 controls other configurations according to a program stored in the memory 223, and performs data processing according to the program and stores the processing result in the memory 223. The CPU 221 functions as the control unit 202 in the functional configuration of the user terminal 200 together with the GPU 222.

The GPU 222 generates an image under the control of the CPU 221. The GPU 222 can be a microprocessor. The GPU 222 functions as the control unit 202 in the functional configuration of the user terminal 200 together with the CPU 221.

The memory 223 stores data and programs executed by the CPU 221. The memory 223 can be a RAM. The memory 223 functions as the storage unit 203 in the functional configuration of the user terminal 200 together with the storage 224.

The storage 224 stores a program or data. The storage 224 can be an HDD, an SSD, or the like. The storage 224 functions as the storage unit 203 in the functional configuration of the user terminal 200 together with the memory 223.

The input/output unit 225 receives an input to the user terminal 200, and supplies the output of the user terminal 200 to the outside. The input/output unit 225 includes an input device such as a keyboard or a mouse, an output device such as a display, and a connection interface such as a network. The input/output unit 225 functions as the communication unit 201 in the functional configuration of the user terminal 200.

The hardware configuration of the user terminal 200 is not limited to that shown herein, and any configuration capable of realizing the functional configuration of the user terminal 200 may be adopted. The entire hardware configuration described above or a part of the hardware configuration may be present on a network.

10: information processing system
100: server apparatus
200: user terminal
101, 203: storage unit
102, 201: communication unit
103, 202: control unit

The invention claimed is:

1. An information processing apparatus for receiving a registration of menu information that is information of a menu including ingredients input in a user terminal, comprising:
   a storage that stores ingredients classification information that is information obtained by classifying ingredients into an upper class and a lower class;
   a communication interface configured to receive the menu information from the user terminal; and
   a processor configured to:
      specify each low-order ingredient that is an ingredient included in the lower class of each high-order ingredient, which is an ingredient of the upper class, from the ingredients classification information in a case where the high-order ingredient is included in the menu information,
      control the communication interface to transmit ingredient information including information of the low-order ingredient to the user terminal, and
      receive the registration of the menu information including the low-order ingredient through the communication interface and store the menu information to the storage,
   wherein the storage further stores multilingual information corresponding to each of the upper class and the lower class of the ingredient,
   wherein the processor is further configured to:
      transmit the upper class or the lower class of the ingredient corresponding to a specific language to the user terminal based on receiving a request to display the menu information in the specific language from the user terminal;
      based on a user selecting the lower class of the ingredient and determining that the lower class of the ingredient is not written in the specific language, transmit the upper class of the ingredient to the user terminal in the specific language; and
      based on a first user requesting the lower class of the ingredient in a first language and determining that the lower class of the ingredient is not described in the first language, transmit the lower class of the ingredient in a second language, the second language being a language used for an input of the menu information by a second user, and wherein the specific language and the first language are different languages.

2. The information processing apparatus according to claim 1, wherein the ingredient information is an image of the low-order ingredient.

3. The information processing apparatus according to claim 1, wherein the ingredient information is a detailed description of the low-order ingredient.

4. The information processing apparatus according to claim 1, wherein the communication interface is further configured to acquire a location of the user terminal from the user terminal, and wherein the processor is further configured to control the communication interface to transmit, to the user terminal, the ingredient information of an ingredient selected among the low-order ingredients according to the location of the user terminal.

5. The information processing apparatus according to claim 1, wherein the processor is further configured to control the communication interface to transmit, to the user terminal, the ingredient information of an ingredient selected among the low-order ingredients according to a language used for an input of the menu information.

6. The information processing apparatus according to claim 1, wherein the processor is further configured to control the communication interface to transmit, to the user terminal, the ingredient information of an ingredient selected among the low-order ingredients according to a time at which the menu information is received.

7. An information processing system, comprising:
a first information processing apparatus; and
a second information processing apparatus,
wherein the first information processing apparatus receives a registration of menu information that is information of a menu including ingredients input in the second information processing apparatus, and includes:
a storage that stores ingredients classification information that is information obtained by classifying ingredients into an upper class and a lower class;
a first communication interface configured to receive the menu information from the second information processing apparatus; and
a first processor configured to:
specify each low-order ingredient that is an ingredient included in the lower class of each high-order ingredient, which is an ingredient of the upper class, from the ingredients classification information in a case where the high-order ingredient is included in the menu information,
control the first communication interface to transmit ingredient information including information of the low-order ingredient to the second information processing apparatus, and
receive the registration of the menu information including the low-order ingredient through the first communication interface and store the menu information to the storage, and wherein the second information processing apparatus includes:
a second communication interface configured to receive the ingredient information from the first communication interface; and
a second processor configured to control the second communication interface to transmit the menu information to the first information processing apparatus and present the ingredient information to a user when the second communication interface receives the ingredient information, wherein the storage further stores multilingual information corresponding to each of the upper class and the lower class of the ingredient, wherein the first processor is further configured to:
transmit the upper class or the lower class of the ingredient corresponding to a specific language to the second information processing apparatus based on receiving a request to display the menu information in the specific language from the second information processing apparatus;

based on the user selecting the lower class of the ingredient and determining that the lower class of the ingredient is not written in the specific language, transmit the upper class of the ingredient to the user terminal in the specific language; and based on a first user requesting the lower class of the ingredient in a first language and determining that the lower class of the ingredient is not described in the first language, transmit the lower class of the ingredient in a second language, the second language being a language used for an input of the menu information by a second user, and wherein the specific language and the first language are different languages.

8. An information processing method of receiving a registration of menu information that is information of a menu including ingredients input in a user terminal, comprising:
storing ingredients classification information that is information obtained by classifying ingredients into an upper class and a lower class;
receiving the menu information from the user terminal;
specifying each low-order ingredient that is an ingredient included in the lower class of each high-order ingredient, which is an ingredient of the upper class, from the ingredients classification information in a case where the high-order ingredient is included in the menu information;
transmitting ingredient information including information of the low-order ingredient to the user terminal; and
receiving the registration of the menu information including the low-order ingredient and storing the menu information, wherein the storing the ingredients classification information comprises storing multilingual information corresponding to each of the upper class and the lower class of the ingredient, wherein the transmitting the ingredient information comprises:
transmitting the upper class or the lower class of the ingredient corresponding to a specific language to the user terminal based on receiving a request to display the menu information in the specific language from the user terminal;
based on a user selecting the lower class of the ingredient and determining that the lower class of the ingredient is not written in the specific language, transmitting the upper class of the ingredient to the user terminal in the specific language; and based on a first user requesting the lower class of the ingredient in a first language and determining that the lower class of the ingredient is not described in the first language, transmitting the lower class of the ingredient in a second language, the second language being a language used for an input of the menu information by a second user, and wherein the specific language and the first language are different languages.

9. A non-transitory computer readable storage medium storing a program causing an information processing apparatus for receiving a registration of menu information, which is information of a menu including ingredients input in a user terminal, to execute operations including:

storing ingredients classification information that is information obtained by classifying ingredients into an upper class and a lower class;

receiving the menu information from the user terminal;

specifying each low-order ingredient that is an ingredient included in the lower class of each high-order ingredient, which is an ingredient of the upper class, from the ingredients classification information in a case where the high-order ingredient is included in the menu information;

transmitting ingredient information including information of the low-order ingredient to the user terminal; and receiving the registration of the menu information including the low-order ingredient and storing the menu information, wherein the storing the ingredients classification information comprises storing multilingual information corresponding to each of the upper class and the lower class of the ingredient, wherein the transmitting the ingredient information comprises:

transmitting the upper class or the lower class of the ingredient corresponding to a specific language to the user terminal based on receiving a request to display the menu information in the specific language from the user terminal;

based on a user selecting the lower class of the ingredient and determining that the lower class of the ingredient is not written in the specific language, transmitting the upper class of the ingredient to the user terminal in the specific language; and based on a first user requesting the lower class of the ingredient in a first language and determining that the lower class of the ingredient is not described in the first language, transmitting the lower class of the ingredient in a second language, the second language being a language used for an input of the menu information by a second user, and wherein the specific language and the first language are different languages.

* * * * *